United States Patent
Sales et al.

(10) Patent No.: US 9,910,298 B1
(45) Date of Patent: Mar. 6, 2018

(54) SYSTEMS AND METHODS FOR A COMPUTERIZED TEMPLE FOR USE WITH EYEWEAR

(71) Applicant: Vision Service Plan, Rancho Cordova, CA (US)

(72) Inventors: Jay William Sales, Citrus Heights, CA (US); Richard Chester Klosinski, Jr., Sacramento, CA (US); Matthew Allen Workman, Sacramento, CA (US); Andrew Cook, El Dorado Hills, CA (US)

(73) Assignee: Vision Service Plan, Rancho Cordova, CA (US)

( * ) Notice: Subject to any disclaimer, the term of this patent is extended or adjusted under 35 U.S.C. 154(b) by 0 days.

(21) Appl. No.: 15/489,147

(22) Filed: Apr. 17, 2017

(51) Int. Cl.
*G02C 1/00* (2006.01)
*G02C 11/00* (2006.01)
*G02C 5/14* (2006.01)
*G02C 5/22* (2006.01)
*G02C 11/04* (2006.01)

(52) U.S. Cl.
CPC ............. *G02C 11/10* (2013.01); *G02C 5/146* (2013.01); *G02C 5/22* (2013.01); *G02C 11/04* (2013.01)

(58) Field of Classification Search
CPC .......... G02C 11/10; G02C 7/06; G02C 7/083; G02C 7/104; G02C 7/12
USPC .................................................. 351/158, 41
See application file for complete search history.

(56) References Cited

U.S. PATENT DOCUMENTS

| | | | |
|---|---|---|---|
| 3,505,879 | A | 4/1970 | Vanderberg |
| 3,548,663 | A | 12/1970 | Radin |
| 3,972,038 | A | 7/1976 | Nasa |
| 4,100,401 | A | 7/1978 | Tutt et al. |
| 4,186,609 | A | 2/1980 | Baermann |
| 4,195,642 | A | 4/1980 | Price et al. |

(Continued)

FOREIGN PATENT DOCUMENTS

| | | |
|---|---|---|
| WO | 2005015163 | 2/2005 |
| WO | 2005094667 | 10/2005 |

(Continued)

OTHER PUBLICATIONS

Final Office Action, dated Dec. 15, 2016, from corresponding U.S. Appl. No. 14/506,249.
(Continued)

*Primary Examiner* — Hung Dang
(74) *Attorney, Agent, or Firm* — Brient Globerman, LLC; Kyle M. Globerman

(57) ABSTRACT

A computerized temple for use with a frame to form computerized eyewear has an elongated body having a first end defining a first end wall, wherein the elongated body first end is configured to be pivotally coupled to a frame first end, a second end defining a second end wall, wherein the second end is configured to rest on an ear of a wearer, a first and second side walls that extend between the first end and the second end, and a blind bore formed in the first end wall that extends from the first end toward the second end intermediate the first and the second side walls. In various embodiments, electronic components are received in the blind bore and a closure is at least partially received on the elongated body first end. The closure pivotally couples the elongated body first end to the frame.

19 Claims, 9 Drawing Sheets

(56) References Cited

U.S. PATENT DOCUMENTS

| | | |
|---|---|---|
| 4,281,663 A | 8/1981 | Pringle |
| 4,407,295 A | 10/1983 | Steuer et al. |
| 4,434,801 A | 3/1984 | Jiminez et al. |
| 4,855,942 A | 8/1989 | Bianco |
| 4,878,749 A | 11/1989 | McGee |
| 4,919,530 A | 4/1990 | Hyman |
| 5,422,816 A | 6/1995 | Sprague et al. |
| 5,452,480 A | 9/1995 | Ryden |
| 5,497,143 A | 3/1996 | Matsuo et al. |
| 5,585,871 A | 12/1996 | Linden |
| 5,670,872 A | 9/1997 | Van De Walle et al. |
| 5,746,501 A | 5/1998 | Chien et al. |
| 5,891,042 A | 4/1999 | Sham et al. |
| 5,931,764 A | 8/1999 | Freeman et al. |
| 5,966,680 A | 10/1999 | Butnaru |
| 5,976,083 A | 11/1999 | Richardson et al. |
| 6,013,007 A | 1/2000 | Root et al. |
| 6,183,425 B1 | 2/2001 | Whalen et al. |
| 6,218,958 B1 | 4/2001 | Eichstaedt et al. |
| 6,241,684 B1 | 6/2001 | Amano et al. |
| 6,325,507 B1 | 12/2001 | Jannard et al. |
| 6,381,482 B1 | 4/2002 | Jayaraman et al. |
| 6,431,705 B1 | 8/2002 | Linden et al. |
| 6,439,067 B1 | 8/2002 | Goldman et al. |
| 6,513,532 B2 | 2/2003 | Mault et al. |
| 6,532,298 B1 | 3/2003 | Cambier et al. |
| 6,736,759 B1 | 5/2004 | Stubbs et al. |
| 6,769,767 B2 | 8/2004 | Swab et al. |
| 6,783,501 B2 | 8/2004 | Takahashi et al. |
| 6,790,178 B1 | 9/2004 | Mault et al. |
| 6,812,845 B2 | 11/2004 | Yuzuki et al. |
| 7,187,960 B2 | 3/2007 | Abreu |
| 7,192,136 B2 | 3/2007 | Howell et al. |
| 7,255,437 B2 | 8/2007 | Howell et al. |
| 7,376,238 B1 | 5/2008 | Rivas et al. |
| 7,380,936 B2 | 6/2008 | Howell et al. |
| 7,400,257 B2 | 7/2008 | Rivas |
| 7,401,918 B2 | 7/2008 | Howell et al. |
| 7,438,410 B1 | 10/2008 | Howell et al. |
| 7,454,002 B1 | 11/2008 | Gardner et al. |
| 7,457,434 B2 | 11/2008 | Azar |
| 7,481,531 B2 | 1/2009 | Howell et al. |
| 7,488,294 B2 | 2/2009 | Torch |
| 7,500,746 B1 | 3/2009 | Howell et al. |
| 7,500,747 B2 | 3/2009 | Howell et al. |
| 7,515,054 B2 | 4/2009 | Torch |
| 7,543,934 B2 | 6/2009 | Howell et al. |
| 7,581,833 B2 | 9/2009 | Howell et al. |
| 7,621,634 B2 | 11/2009 | Howell et al. |
| 7,634,379 B2 | 12/2009 | Noble |
| 7,648,463 B1 | 1/2010 | Elhag et al. |
| 7,677,723 B2 | 3/2010 | Howell et al. |
| 7,771,046 B2 | 8/2010 | Howell et al. |
| 7,792,552 B2 | 9/2010 | Thomas et al. |
| 7,793,361 B2 | 9/2010 | Ishihara et al. |
| 7,857,772 B2 | 9/2010 | Bouvier et al. |
| 7,806,525 B2 | 10/2010 | Howell et al. |
| 7,922,321 B2 | 4/2011 | Howell et al. |
| 7,987,070 B2 | 7/2011 | Kahn et al. |
| 8,007,450 B2 | 8/2011 | Williams |
| 8,081,082 B2 | 12/2011 | Malik et al. |
| 8,109,629 B2 | 2/2012 | Howell et al. |
| 8,157,730 B2 | 4/2012 | Leboeuf et al. |
| 8,188,868 B2 | 5/2012 | Case |
| 8,202,148 B2 | 6/2012 | Young |
| 8,294,581 B2 | 10/2012 | Kamen |
| 8,303,311 B2 | 11/2012 | Forest |
| 8,337,013 B2 | 12/2012 | Howell et al. |
| 8,384,617 B2 | 2/2013 | Braun et al. |
| 8,430,507 B2 | 4/2013 | Howell et al. |
| 8,448,846 B2 | 5/2013 | Needham et al. |
| 8,449,471 B2 | 5/2013 | Tran |
| 8,465,151 B2 | 6/2013 | Howell et al. |
| 8,494,507 B1 | 7/2013 | Tedesco et al. |
| 8,500,271 B2 | 8/2013 | Howell et al. |
| 8,510,166 B2 | 8/2013 | Neven |
| 8,540,583 B2 | 9/2013 | Leech |
| 8,568,313 B2 | 10/2013 | Sadhu |
| 8,594,971 B2 | 11/2013 | Keal et al. |
| 8,620,600 B2 | 12/2013 | Vock et al. |
| 8,630,633 B1 | 1/2014 | Tedesco et al. |
| 8,634,701 B2 | 1/2014 | Kang et al. |
| 8,647,270 B2 | 2/2014 | Leboeuf et al. |
| 8,690,750 B2 | 4/2014 | Krueger |
| 8,696,113 B2 | 4/2014 | Lewis |
| 8,733,928 B1 | 5/2014 | Lewis |
| 8,750,971 B2 | 6/2014 | Tran |
| 8,764,651 B2 | 7/2014 | Tran |
| 8,849,610 B2 | 9/2014 | Molettiere et al. |
| 8,892,401 B2 | 11/2014 | Yuen et al. |
| 8,905,542 B2 | 12/2014 | Howell et al. |
| 8,911,087 B2 | 12/2014 | Publicover et al. |
| 8,920,332 B2 | 12/2014 | Hong et al. |
| 8,931,896 B2 | 1/2015 | Blum et al. |
| 8,941,560 B2 | 1/2015 | Wong et al. |
| 8,961,415 B2 | 2/2015 | Leboeuf et al. |
| 8,964,298 B2 | 2/2015 | Haddick et al. |
| 8,979,295 B2 | 3/2015 | Waters |
| 9,001,427 B2 | 4/2015 | Jacobs et al. |
| 9,005,129 B2 | 4/2015 | Venkatraman et al. |
| 9,007,220 B2 | 4/2015 | Johns et al. |
| 9,028,405 B2 | 5/2015 | Tran |
| 9,031,812 B2 | 5/2015 | Roberts et al. |
| 9,033,493 B2 | 5/2015 | Howell et al. |
| 9,035,970 B2 | 5/2015 | Lamb et al. |
| 9,050,033 B2 | 6/2015 | Yoneyama et al. |
| 9,064,342 B2 | 6/2015 | Yuen et al. |
| 9,113,794 B2 | 8/2015 | Hong et al. |
| 9,113,795 B2 | 8/2015 | Hong et al. |
| 9,144,405 B2 | 9/2015 | Kim et al. |
| 9,215,290 B2 | 12/2015 | Yuen et al. |
| 9,235,064 B2 | 1/2016 | Lewis |
| 9,239,473 B2 | 1/2016 | Lewis |
| 9,241,635 B2 | 1/2016 | Yuen et al. |
| 9,244,293 B2 | 1/2016 | Lewis |
| 9,254,100 B2 | 2/2016 | Beck et al. |
| 9,304,331 B2 | 4/2016 | Carrara |
| 9,520,638 B2 | 12/2016 | Baringer et al. |
| 9,529,197 B2 | 12/2016 | Olsson et al. |
| 9,579,060 B1 | 2/2017 | Lisy et al. |
| 2001/0031031 A1 | 10/2001 | Ogawa et al. |
| 2002/0151810 A1 | 10/2002 | Wong et al. |
| 2003/0195398 A1 | 10/2003 | Suzuki et al. |
| 2005/0033200 A1 | 2/2005 | Soehren et al. |
| 2005/0036103 A1 | 2/2005 | Bloch |
| 2005/0054942 A1 | 3/2005 | Melker et al. |
| 2006/0115130 A1 | 6/2006 | Kozlay |
| 2007/0273611 A1 | 11/2007 | Torch |
| 2008/0137916 A1 | 6/2008 | Lauper et al. |
| 2009/0030350 A1 | 1/2009 | Yang et al. |
| 2009/0195747 A1 | 8/2009 | Insua |
| 2009/0227853 A1 | 9/2009 | Wijesiriwardana |
| 2009/0267805 A1 | 10/2009 | Jin et al. |
| 2010/0042430 A1 | 2/2010 | Bartfeld |
| 2010/0045928 A1 | 2/2010 | Levy |
| 2010/0110368 A1 | 5/2010 | Chaum |
| 2010/0136508 A1 | 6/2010 | Zekhtser |
| 2010/0271587 A1 | 10/2010 | Pavlopoulos |
| 2010/0280336 A1 | 11/2010 | Giftakis et al. |
| 2010/0308999 A1 | 12/2010 | Chornenky |
| 2010/0332571 A1 | 12/2010 | Healey et al. |
| 2011/0169932 A1 | 7/2011 | Mula et al. |
| 2011/0224505 A1 | 9/2011 | Sadhu |
| 2012/0021806 A1 | 1/2012 | Maltz |
| 2012/0029367 A1 | 2/2012 | Hobeika |
| 2012/0127423 A1 | 5/2012 | Blum et al. |
| 2012/0133885 A1 | 5/2012 | Howell et al. |
| 2012/0135384 A1 | 5/2012 | Nakao |
| 2012/0142443 A1 | 6/2012 | Savarese et al. |
| 2012/0169990 A1 | 7/2012 | Burnstein |
| 2012/0191016 A1 | 7/2012 | Jastram |
| 2012/0203310 A1 | 8/2012 | Pugh et al. |
| 2012/0206485 A1 | 8/2012 | Osterhout et al. |
| 2012/0310442 A1 | 12/2012 | Doutaz et al. |

(56) References Cited

U.S. PATENT DOCUMENTS

| | | |
|---|---|---|
| 2013/0009907 A1 | 1/2013 | Rosenberg et al. |
| 2013/0024022 A1 | 1/2013 | Bowers |
| 2013/0024211 A1 | 1/2013 | Monteforte et al. |
| 2013/0041590 A1 | 2/2013 | Bunch et al. |
| 2013/0050258 A1 | 2/2013 | Liu et al. |
| 2013/0096397 A1 | 4/2013 | Kiso et al. |
| 2013/0138413 A1 | 5/2013 | Finch et al. |
| 2013/0157232 A1 | 6/2013 | Ehrenkranz |
| 2013/0242262 A1 | 9/2013 | Lewis |
| 2013/0274587 A1 | 10/2013 | Coza et al. |
| 2013/0274904 A1 | 10/2013 | Coza et al. |
| 2013/0307670 A1 | 11/2013 | Ramaci |
| 2013/0329183 A1 | 12/2013 | Blum et al. |
| 2013/0345168 A1 | 12/2013 | Kim et al. |
| 2014/0028456 A1 | 1/2014 | Sadhu |
| 2014/0031703 A1 | 1/2014 | Rayner et al. |
| 2014/0063242 A1 | 3/2014 | Hanina et al. |
| 2014/0073081 A1 | 3/2014 | Wang |
| 2014/0078049 A1 | 3/2014 | Parshionikar |
| 2014/0085190 A1 | 3/2014 | Erinjippurath et al. |
| 2014/0135593 A1 | 5/2014 | Jayalth et al. |
| 2014/0142459 A1 | 5/2014 | Jayalth et al. |
| 2014/0159862 A1 | 6/2014 | Yang et al. |
| 2014/0204334 A1 | 7/2014 | Stoll |
| 2014/0207264 A1 | 7/2014 | Quy |
| 2014/0218281 A1 | 8/2014 | Amayeh et al. |
| 2014/0228649 A1 | 8/2014 | Rayner et al. |
| 2014/0229220 A1 | 8/2014 | Yuen et al. |
| 2014/0247145 A1 | 9/2014 | Proud |
| 2014/0266988 A1 | 9/2014 | Fisher et al. |
| 2014/0276096 A1 | 9/2014 | Bonutti |
| 2014/0340221 A1 | 11/2014 | Yuen et al. |
| 2014/0346158 A1 | 11/2014 | Matthews |
| 2014/0375452 A1 | 12/2014 | Yuen et al. |
| 2014/0375470 A1 | 12/2014 | Malveaux |
| 2014/0378872 A1 | 12/2014 | Hong et al. |
| 2015/0057512 A1 | 2/2015 | Kapoor |
| 2015/0085245 A1 | 3/2015 | Howell et al. |
| 2015/0088464 A1 | 3/2015 | Yuen et al. |
| 2015/0173631 A1 | 6/2015 | Richards et al. |
| 2015/0179050 A1 | 6/2015 | Katingari et al. |
| 2015/0185506 A1 | 7/2015 | Lewis |
| 2015/0212329 A1* | 7/2015 | Sugihara ............... G02B 27/017 351/158 |
| 2015/0223805 A1 | 8/2015 | Whitman et al. |
| 2015/0244910 A1 | 8/2015 | Marston et al. |
| 2015/0281879 A1 | 10/2015 | Saadi |
| 2015/0287338 A1 | 10/2015 | Wells et al. |
| 2015/0332149 A1 | 11/2015 | Kolb et al. |
| 2015/0342482 A1 | 12/2015 | Carrara |
| 2015/0366518 A1 | 12/2015 | Sampson |
| 2016/0007849 A1 | 1/2016 | Krueger |
| 2016/0034042 A1 | 2/2016 | Joo |
| 2016/0041404 A1 | 2/2016 | Palermo et al. |
| 2016/0041613 A1 | 2/2016 | Klanner et al. |
| 2016/0117937 A1 | 4/2016 | Penders et al. |
| 2016/0314468 A1 | 10/2016 | Smith et al. |
| 2017/0071528 A1 | 3/2017 | Chen |

FOREIGN PATENT DOCUMENTS

| | | |
|---|---|---|
| WO | 2008073806 | 6/2008 |
| WO | 2010006370 | 1/2010 |
| WO | 2010062479 | 6/2010 |
| WO | 2010062481 | 6/2010 |
| WO | 2011086466 | 7/2011 |
| WO | 2012041485 | 4/2012 |
| WO | 2013188343 | 12/2013 |
| WO | 2014108481 | 7/2014 |
| WO | 2014144918 | 9/2014 |
| WO | 2014144940 | 9/2014 |
| WO | 2014170280 | 10/2014 |
| WO | 2014188244 | 11/2014 |
| WO | 2015015025 | 2/2015 |
| WO | 2015081299 | 6/2015 |
| WO | 2015095924 | 7/2015 |
| WO | 2015127143 | 8/2015 |
| WO | 2015127441 | 8/2015 |
| WO | 2016017997 | 2/2016 |

OTHER PUBLICATIONS

Final Office Action, dated Mar. 29, 2017, from corresponding U.S. Appl. No. 14/562,454.

Final Office Action, dated Sep. 26, 2016, from corresponding U.S. Appl. No. 14/610,628.

International Preliminary Report on Patentability, dated Mar. 16, 2017, from corresponding International Application No. PCT/US2015/048612.

International Preliminary Report on Patentability, dated Mar. 16, 2017, from corresponding International Application No. PCT/US2015/048656.

International Preliminary Report on Patentability, dated Mar. 16, 2017, from corresponding International Application No. PCT/US2015/048662.

International Search Report, dated Dec. 18, 2015, from corresponding International Application No. PCT/US2015/048662.

International Search Report, dated Jan. 21, 2016, from corresponding International Application No. PCT/US2015/048612.

International Search Report, dated Jan. 21, 2016, from corresponding International Application No. PCT/US2015/048656.

International Search Report, dated Jun. 2, 2016, from corresponding International Application No. PCT/US2016/015705.

Invitation to Pay Additional Search Fees, dated Apr. 1, 2016, from corresponding International Application Serial No. PCT/US2016/015705.

Invitation to Pay Additional Search Fees, dated Nov. 4, 2015, from corresponding International Application Serial No. PCT/US2015/048612.

Invitation to Pay Additional Search Fees, dated Nov. 4, 2015, from corresponding International Application Serial No. PCT/US2015/048656.

Maria S. Redin, "Marathon Man", Article Jun. 15, 1998, MIT Media Laboratory.

Michael Franco, Tzoa wearable turns you into a walking air-quality sensor, Dec. 9, 2014, CNET, https://www.cnet.com/news/tzoa-wearable-turns-you-into-a-walking-air-quality-sensor/.

Notice of Allowance, dated Feb. 28, 2017, from corresponding U.S. Appl. No. 14/588,122.

Office Action, dated Aug. 19, 2016, from corresponding U.S. Appl. No. 14/578,039.

Office Action, dated Dec. 29, 2016, from corresponding U.S. Appl. No. 14/610,589.

Office Action, dated Feb. 10, 2017, from corresponding U.S. Appl. No. 14/846,401.

Office Action, dated Jul. 1, 2016, from corresponding U.S. Appl. No. 14/562,454.

Office Action, dated Jul. 22, 2016, from corresponding U.S. Appl. No. 14/506,249.

Office Action, dated Mar. 3, 2017, from corresponding U.S. Appl. No. 14/610,628.

Office Action, dated Mar. 8, 2016, from corresponding U.S. Appl. No. 14/610,628.

Office Action, dated Sep. 2, 2016, from corresponding U.S. Appl. No. 14/588,122.

Phend, Crystal, "Calorie Intake Rises as Sleep Time Drops," Medpage Today, Medpage Today, LLC, Mar. 15, 2012, Web Dec. 19, 2016, http://www.medpagetoday/com/cardiology/prevention/31663.

Restriction Requirement, dated Nov. 10, 2016, from corresponding U.S. Appl. No. 14/846,401.

Richard M. Satava, et al., "The Physiologic Cipher at Altitude: Telemedicine and Real-Time Monitoring of Climbers on Mount Everest", Telemedicine Journal and e-Health, vol. 6, No. 3, 2000, Mary Ann Liebert, Inc.

(56) References Cited

OTHER PUBLICATIONS

Ted Burnham, Wearable Air Quality Sensor: Tzoa, Jan. 5, 2015, Postscapes, http://www.postscapes.com/wearable-air-quality-sensor-tzoa/.
Written Opinion of the International Searching Authority, dated Dec. 18, 2015, from corresponding International Application No. PCT/US2015/048662.
Written Opinion of the International Searching Authority, dated Jan. 21, 2016, from corresponding International Application No. PCT/US2015/048612.
Written Opinion of the International Searching Authority, dated Jan. 21, 2016, from corresponding International Application No. PCT/US2015/048656.
Written Opinion of the International Searching Authority, dated Jun. 2, 2016, from corresponding International Application No. PCT/US2016/015705.
Final Office Action, dated Jun. 30, 2017, from corresponding U.S. Appl. No. 14/610,589.
Shankland, Stephen, "Google's electronic eyewear get 'OK Glass' voice commands", Feb. 20, 2013, Cnet.com, https://www.cnet.com/news/googles-electronic-eyewear-gets-ok-glass-voice-commands/.
Final Office Action, dated Jul. 10, 2017, from corresponding U.S. Appl. No. 14/846,401.
Final Office Action, dated May 23, 2017, from corresponding U.S. Appl. No. 14/578,039.
Notice of Allowance, dated Jun. 21, 2017, from corresponding U.S. Appl. No. 14/562,454.
Office Action, dated Jun. 27, 2017, from corresponding U.S. Appl. No. 15/060,333.
Tolentino, Mellisa, Udderly Clever Wearable Tech Solutions, http://siliconangle.com/blog/2014/03/25/udderly-clever-wearable-tech-solutions/, Mar. 25, 2014.
Torres, Juan Carlos, ODG R-7 Smart Glasses Carries Its Own Android Inside, http://androidcommunity.com/odg-r-7-smart-glasses-carries-its-own-android-inside-20140919/, Sep. 19, 2014.
Office Action, dated Sep. 29, 2017, from corresponding U.S. Appl. No. 14/506,249.
Restriction Requirement, dated Oct. 4, 2017, from corresponding U.S. Appl. No. 14/610,439.
Office Action, dated Sep. 26, 2017, from corresponding U.S. Appl. No. 14/846,401.
Restriction Requirement, dated Sep. 13, 2017, from corresponding U.S. Appl. No. 14/550,406.
Final Office Action, dated Nov. 16, 2017, from corresponding U.S. Appl. No. 14/610,628.
Office Action, dated Nov. 30, 2017, from corresponding U.S. Appl. No. 14/550,406.
Jeannet, Pierre-Yves, et al., "Continuous monitoring and quantification of multiple parameters of daily physical activity in ambulatory Duchenne muscular , dystrophy patients", Official Journal of the European Paediatric Neurology Society, 2011.
Notice of Allowance, dated Dec. 13, 2017, from corresponding U.S. Appl. No. 14/610,501.

\* cited by examiner

SYSTEMS AND METHODS FOR A COMPUTERIZED TEMPLE FOR USE WITH EYEWEAR

BACKGROUND

It has become increasingly important to monitor the health and activities of individuals. Accordingly, there is a need for improved devices that make monitoring these aspects of an individual easier and more convenient to use. Additionally, since such devices may comprise one or more computer processors and/or sensors, may require power to operate, and may be powered by one or more rechargeable batteries, there is also a need for improved systems and methods for charging such devices. Various embodiments of the present systems and methods recognize and address the foregoing considerations, and others, of prior art devices.

SUMMARY

A computerized temple, according to various embodiments, comprises an elongated body having (a) a first end defining a first end wall, (b) a second end defining a second end wall, (c) a first side wall that extends between the first end and the second end, (d) a second side wall that extends between the first end and the second end, and (e) a blind bore formed in the first end wall that extends from the first end toward the second end. In various embodiments, the computerized temple further comprises at least one processor, one or more sensors operatively coupled to the at least one processor, and a power source operatively coupled to the at least one processor and the one or more sensors. In some embodiments, the temple body first end is configured to be releasably attached to an end of a frame, and the at least one processor and the power source are configured to be received in the blind bore.

In various embodiments, the computerized eyewear temple further comprises a closure that is coupled to the elongated body first end such that the closure at least partially covers a portion of the blind bore formed in the first end wall. In some embodiments, the closure forms a portion of a hinge that is used to rotationally couple the elongated body to the frame of the eyewear. In particular embodiments, an opening is formed through a portion of the hinge and a light is positioned in the opening. In some embodiments, the light is operatively coupled to the at least one processor.

In particular embodiments, the one or more sensors are configured to be received in the blind bore with the at least one processor and the power source. In other embodiments, the one or more sensors are configured to be coupled to the frame of the eyewear.

In various embodiments, the computerized eyewear temple further comprises a charging port connection (e.g., a USB port, a micro USB port, a magnetic charging port, etc.) that is operatively coupled to at least one of the at least one processor or the power source, where the charging port connection is accessible through the closure to allow a user to charge the power source. In some embodiments, the charging port connection is hidden when the computerized eyewear temple is coupled to the frame and positioned perpendicular to the frame. In various embodiments, the computerized eyewear temple further comprises a first half-lock and a second half-lock spaced apart from the first half-lock. In particular embodiments, at least one of the at least one processor or the power source is received intermediate the first and second half-locks such that when the first and second half-locks are placed into the elongated body blind bore, the first and second half-locks securely maintain the at least one of the at least one processor or the power source in the elongated body blind bore and prevent it from sliding or rotating in the elongated body blind bore.

Computerized eyewear according to certain embodiments comprises (1) a frame having (a) a first end, (b) a second end, (c) a front surface that extends between the first frame end and the second frame end, (d) a rear surface that extends between the first frame end and the second frame end, and (2) a computerized temple comprising an elongated body having (a) a first end defining a first end wall, wherein the elongated body first end is pivotally coupled to the frame first end, (b) a second end defining a second end wall, wherein the second end is configured to rest on an ear of a wearer of the computerized eyewear, (c) a first side wall and a second side wall that extend between the first end and the second end, and (d) a blind bore formed in the first end wall that extends from the first end toward the second end. In various embodiments, at least one processor and a power source is received in the blind bore formed in the first end wall of the elongated body. In some embodiments, the power source is operatively coupled to the at least one processor. In particular embodiments, at least one sensor is operatively coupled to the at least one processor and is also received in the elongated body blind bore.

In particular embodiments, the computerized eyewear further comprises a charging socket that is positioned at least partially over the blind bore formed in the first end of the elongated body, wherein the charging socket is operatively couple to the power source. In some embodiments, the charging socket further comprises a paramagnetic plate.

In certain embodiments, a computerized temple for use with a frame to form computerized eyewear comprises (1) an elongated body having (a) a first end defining a first end wall, wherein the elongated body first end is configured to be pivotally coupled to a frame first end, (b) a second end defining a second end wall, wherein the second end is configured to rest on an ear of a wearer, (c) a first side wall and a second side wall that extend between the first end and the second end, and (d) a blind bore formed in the first end wall that extends from the first end toward the second end intermediate the first and the second side walls, (2) electronic components received in the blind bore formed in the first end wall of the elongated body, and (3) a closure at least partially received on the elongated body first end. In various embodiments, the closure pivotally couples the elongated body first end to the frame. In some embodiments, the closure further comprises a portion of a hinge that is used to pivotally couple the elongated body first end to the frame.

In particular embodiments, the computerized temple further comprises a first half-lock, and a second half-lock that are spaced apart from one another so that a portion of the electronic components is positioned intermediate the first half-lock and the second half-lock. In various embodiments, the first and second half-locks are used to secure the electronic components within the blind bore. In some embodiments, a portion of a charging port may be positioned intermediate the first and second half locks in addition to one or more other electronic components. In this way, the sandwich of the charging port between the first and second half-locks aid in forming a water tight assembly since the charging port and first and second half-locks are received at the open end of the blind bore. In other embodiments, one or more fasteners pass through a portion of the closure and the first side wall. The one or more fasteners are secured to at least one of the first and the second half-locks so that the electronic components do not slide within the blind bore.

BRIEF DESCRIPTION OF THE DRAWINGS

Various embodiments of a computerized temple for assessing a user's health and activities are described below. In the course of this description, reference will be made to the accompanying drawings, which are not necessarily drawn to scale and wherein.

DETAILED DESCRIPTION

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Eyewear

In various embodiments, eyewear may be converted to computerized eyewear by attaching a computerized temple to the standard eyewear frame. The computerized temple may be formed from an elongated body having a first end and a second end, where the elongated body extends between the first and second ends. A blind bore is formed in a wall of the first end so that the blind bore extends from the wall of the temple first end to a point intermediate the temple first and second ends. One or more electronic components that are operatively coupled to one another may be placed into the blind bore. The electronic components may comprise one or more processors, one or more power sources and/or one or more sensors. A hinge portion having a closure may be seated on the temple first end to close off the blind bore and seal the electronic components in the blind bore. One or more O-rings may be used to form a water tight seal to protect the electronic components from water and sweat when the electronic eyewear is being worn by the user or being cleaned.

Eyewear

Figure 1:
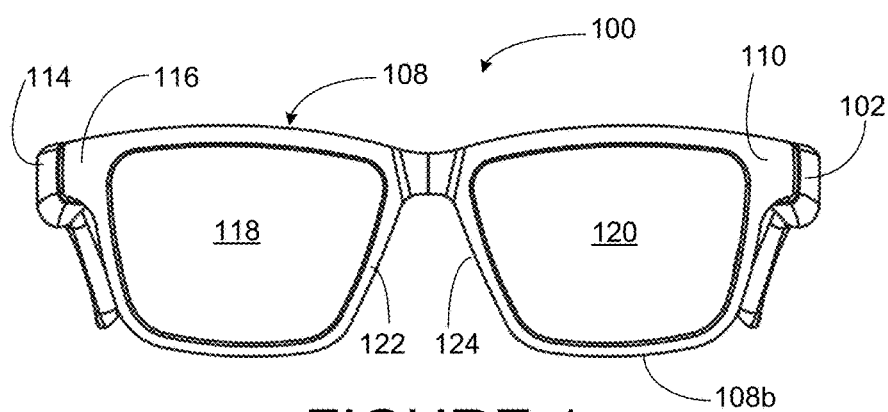
FIG. 1 is a front perspective view of an embodiment of computerized eyewear.
Figure 2:
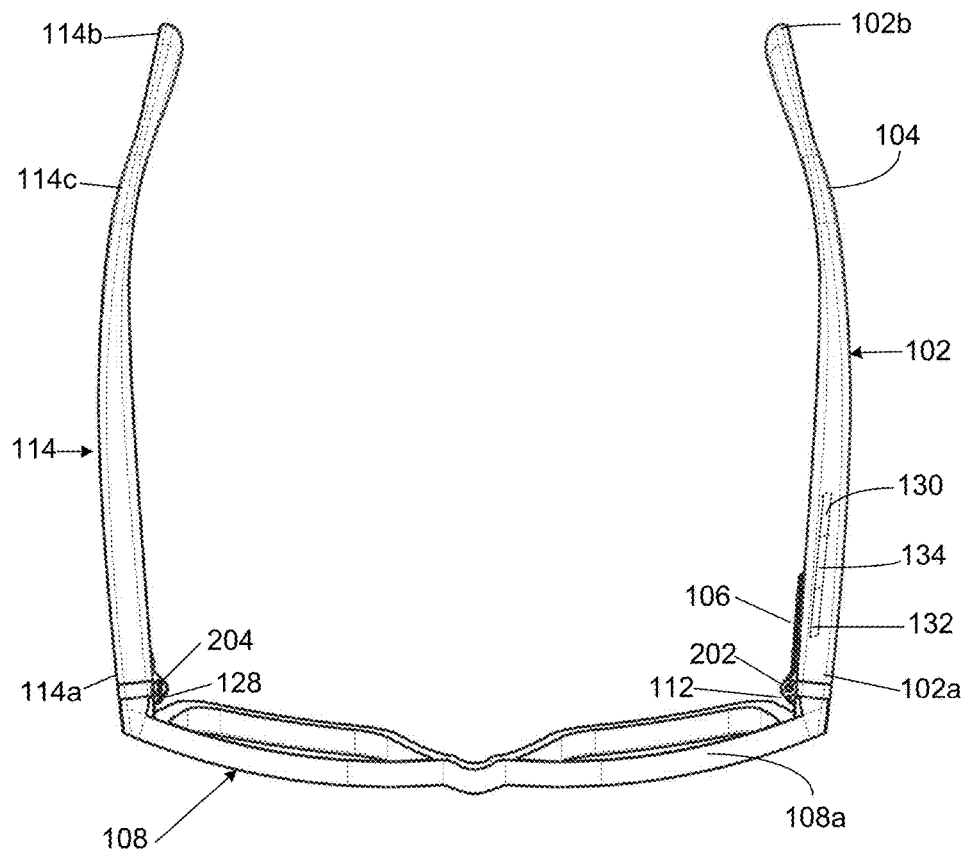
FIG. 2 is a top view of the computerized eyewear of FIG. 1 with a computerized eyewear temple attached to the frame.
Figure 3:
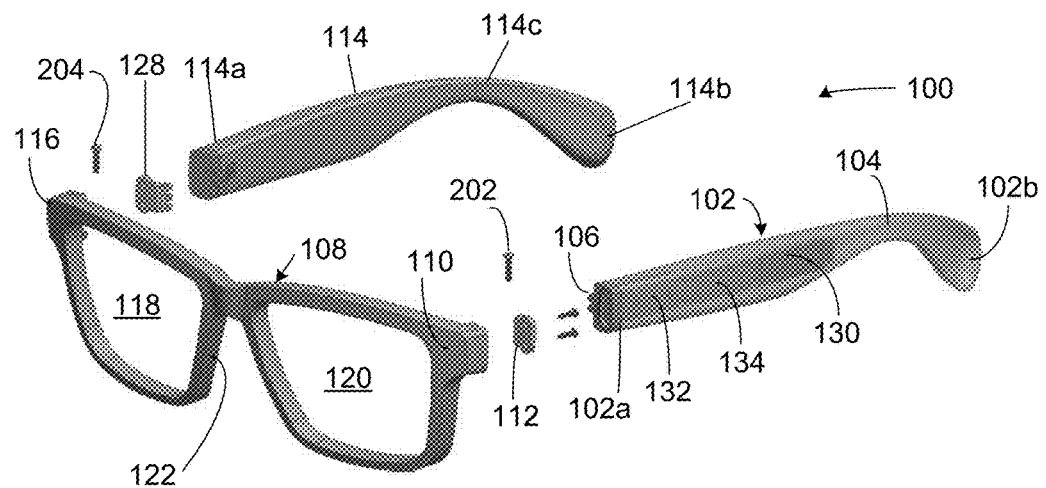
FIG. 3 is an exploded perspective view of the computerized eyewear of FIG. 1 illustrating how the computerized temples are attached to the frame front according to various embodiments.

As shown in FIGS. 1-3, eyewear 100, according to various embodiments, is a standard pair of eyewear (e.g., any suitable pair of eyewear with a frame and one or more temples) that has had one of its temples replaced with a computerized temple 102 (e.g., the standard pair of eyewear has been retrofitted to include a computerized temple 102). In particular embodiments, the eyewear 100 includes: (1) an eyewear frame 108; (2) a computerized temple 102 with one or more sensors 130 that is attached (e.g., pivotably attached) to a first lateral side of the eyewear frame; and (3) a second temple 114 that is attached (e.g., pivotably attached) to a second lateral side of the eyewear frame. These various components are discussed in more detail below.

Eyewear Frame

Still referring to FIGS. 1-3, eyewear 100, in various embodiments, includes any suitable eyewear frame 108 configured to support one or more lenses 118, 120. In the embodiment shown in this figure, the eyewear frame 108 has a first end 110 and a second end 116. The eyewear frame 108 also has a top surface 108a (e.g., brow bar and bridge), and a bottom surface 108b (e.g., the bottom surface of the frame's first and second lens rims). The eyewear frame 108 may be made of any suitable material such as one or more metals, metal alloys, ceramics, polymers, etc. or any combination thereof. In particular embodiments, the eyewear frame 108 is configured to support the first and second lenses 118, 120 about the full perimeter of the lenses. In other embodiments, the eyewear frame 108 may be configured to support the first and second lenses 118, 120 about only a portion of each respective lens (e.g., a semi-rimless or rimless frame). In various embodiments, the eyewear frame 108 is configured to support a number of lenses other than two lenses (e.g., a single lens, a plurality of lenses, etc.). In particular embodiments, the lenses 118, 120 may include prescription lenses, sunglass lenses, or any other suitable type of lens (e.g., reading lenses, non-prescription lenses), which may be formed, for example, from glass or a suitable polymer.

The eyewear frame 108 includes a first nose pad 122 and a second nose pad 124, which may be configured to maintain the eyewear 100 adjacent the front of a wearer's face such that the lenses 118, 120 are positioned substantially in front of the wearer's eyes while the wearer is wearing the eyewear 100. In particular embodiments, the nose pads 122, 124 may comprise a material that is configured to be comfortable when worn by the wearer (e.g., rubber, polymer, etc.). In other embodiments, the nose pads 122, 124 may include any other suitable material (e.g., plastic, metal, etc.). In still other embodiments, the nose pads 122, 124 may be integrally formed with the frame 108 and made from the same material as the eyewear frame 108.

The eyewear frame 108 includes a first connection receiving end 112 that attaches the computerized temple 102 to the frame first end 110, and a second connection receiving end 128 that attaches the second temple 114 to the frame second end 116. In various embodiments, the connection receiving ends 112, 128 may be releasably coupled to the computerized temple 102 and the second temple 114, respectively, by any suitable connection (e.g., tongue and groove, ball and socket, spring hinge, friction fit, screw, spring loaded ball and catch, spring loaded pin and catch, spring tab and catch, hinge and screw, etc.). In particular embodiments, the first and second connection receiving ends 112, 128 may be welded to, or integrally formed with, the eyewear frame 108. In some embodiments, the computerized temple 102 is pivotally coupled to the frame first end 110 by a hinge as described in more detail in FIG. 3.

Computerized Temple

As shown in FIGS. 2-3, the computerized temple 102 has an elongated body that includes a first end 102a and a second end 102b. In various embodiments, the first end 102a has a coupling that is configured to retrofit to at least a portion of a hinge of a standard pair of eyewear. In particular embodiments, the second end 102b defines an earpiece 104 proximate the second end 102b that is configured to support the temple on a wearer's ear. A temple hinge connection 106 is proximate the first end 102a. The computerized temple 102 also has a top surface, a bottom surface, an outer (front) surface, and an inner (back) surface (surfaces not numbered).

Referring to FIG. 3, the temple hinge connection 106 is adapted to be releasably coupled to the eyewear frame first connection receiving end 112 by any suitable hinge connection 202 (e.g., ball and socket hinge connection, friction fit hinge, screw hinge, spring loaded ball and catch hinge, spring loaded pin and catch hinge, or spring tab and catch hinge). In various embodiments, the eyewear frame first connection receiving end 112 may contain a first portion of a hinge and the computerized temple hinge connection 106 may contain a second portion of the hinge, where the first and second portions of the hinge together form a pivotable hinge. Thus, the computerized temple 102 is releasably coupled to the eyewear frame 108 at the eyewear frame first end 110 by the coupling of the first hinge connection receiving end 112 to the temple hinge connection 106 at the hinge connection 202 (FIG. 2). For each of the different hinge connections, the first hinge connection receiving end 112 and the temple hinge connection 106 are formed by complimentary hinge connections. For instance, where the first hinge connection receiving end 112 includes a ball, the temple hinge connection 106 may include a socket. As a further example, where the first hinge connection receiving end 112 includes a screw hinge, the temple hinge connection 106 may also include a screw hinge. In various embodiments, the first hinge connection receiving end 112 further comprises a cavity 202 (FIG. 5) that opens to at least the computerized temple first end 102. In particular embodiments, the cavity is configured to receive at least a portion of the hinge connection receiving end 112 and the computerized temple 102 is thereby releasably secured to at least a portion of the hinge connection receiving end 112 by a press-fit.

Still referring to FIGS. 2 and 3, the computerized temple 102 includes one or more sensors 130, at least one processor 132, and a power source 134 coupled (e.g., embedded in, coupled to, operatively coupled to, received in, etc.) to the computerized temple 102. In particular embodiments, the at least one processor 132 is operatively coupled to the one or more sensors 130. In other embodiments, the power source 134 is operatively coupled to the at least one processor 132 and the one or more sensors 130. In various embodiments, each of the one or more sensors 130, the at least one processor 132, and the power source 134 may be coupled to the temple. In still other embodiments, the one or more sensors 130 may be coupled to one or more portions of the frame 108, the computerized temple 102, the second temple 114, the first and second lenses 118, 120, or any other portion (e.g., the nose pads 122, 124, the rim 108b, etc.) of the eyewear 100 in any suitable way.

As a further example, the at least one processor 132 and the power source 134 may be embedded (e.g., received in a cavity formed in the temple 102) into the computerized temple 102. In some such embodiments, at least one of the one or more sensors 130 may be embedded or coupled to the computerized temple 102, another of the one or more sensors 130 may be coupled to the frame 108, and still another of the one or more sensors 130 may be operatively coupled to the nose piece 122 (FIG. 1). In various embodiments, the one or more sensors 130, the at least one processor 132, and the power source 134 may be coupled at any point along the eyewear 100 and/or the computerized temple 102.

In particular embodiments, the computerized temple 102 may further include one or more user interfaces for communicating with a wearer of the computerized temple 102. For example, the computerized temple 102 may include one or more speakers, microphones, displays, haptic output devices and/or other user interface devices (e.g., lights, touch buttons, etc.) that are operatively coupled to facilitate the transfer of information between the wearer of the temple and the temple's one or more processors (e.g., while the wearer is wearing the temple). The computerized temple 102 may further include one or more wireless communications devices (e.g., a Bluetooth chip, a near field communications chip, or a cellular communications chip) for facilitating communication between the computerized temple 102 and one or more remote computing devices (e.g., a central server or the wearer's handheld computing device, laptop computer, etc.).

In particular embodiments, a haptic device (e.g., a device that applies forces, vibrations or motions to the user) may provide output signals to the wearer in response to input commands. For example, if the computerized eyewear is wireless linked to the wearer's mobile computing device, a haptic feedback device may notify a wearer when a call is received, a text message is received or when any other notification is being provided. In some embodiments, instead of, or in addition to, providing a notification from a handheld device linked to the computerized eyewear, the computerized eyewear itself may provide notifications to the wearer for actions or commands directly provided by the computerized eyewear. In some embodiments, the computerized eyewear may also contain haptic input devices that incorporate tactile sensors that measure forces exerted by the wearer on the haptic input device. Thus, the device can provide tactile output as well as receiving tactile inputs from the wearer.

In various embodiments, the one or more sensors 130, the at least one processor 132, and the power source 134 may be formed in any shape. In particular embodiments, the one or more sensors 130, the at least one processor 132, and the power source 134 may be formed on one or more circuit boards that are received in the temple 102 as described in greater detail herein.

Sensors

Still referring to FIGS. 2 and 3, the computerized temple 102, according to various embodiments, includes one or more sensors 130 that are operatively coupled to the at least one processor 132. In particular embodiments, the one or more sensors 130 are configured to determine one or more current physical attributes of the wearer (e.g., heart rate, brain wave activity, movement, body temperature, blood pressure, oxygen saturation level, etc.). In various embodiments, the one or more sensors 130 are configured to detect one or more physiological characteristics associated with the wearer of the computerized temple 102. In some embodiments, the physiological characteristics may include, for example: (1) the wearer's heart rate; (2) the wearer's respiratory rate; (3) the wearer's brainwave activity; (4) a gait pattern of the wearer; (5) a head position of the wearer; (6) a speed of the wearer; and (7) a movement pattern of the wearer. In still other embodiments, the one or more sensors 130 are configured to detect one or more characteristics of the environment surrounding the wearer of the computerized temple 102. In various embodiments, the characteristic of the environment may include, for example: (1) the wearer's location; (2) a medicine that the wearer is preparing to take; (3) a food that the wearer is preparing to eat; (4) an amount of ultraviolet light that the wearer is subjected to; (5) a smell of an item in close proximity to the wearer; (6) a proximity of the wearer to an object; and (7) an identity of an object associated with the wearer.

The one or more sensors 130 may include, for example: (1) one or more heart rate monitors; (2) one or more electrocardiograms (EKG); (3) one or more electroencephalograms (EEG); (4) one or more pedometers; (5) one or more thermometers; (6) one or more transdermal sensors; (7) one or more front-facing cameras; (8) one or more eye-facing cameras; (9) one or more microphones; (10) one or more accelerometers; (11) one or more blood pressure sensors; (12) one or more pulse oximeters; (13) one or more respiratory rate sensors; (14) one or more blood alcohol concentration (BAC) sensors; (15) one or more near-field communication sensors; (16) one or more motion sensors; (17) one or more gyroscopes; (18) one or more geomagnetic sensors; (19) one or more global positioning system (GPS) sensors; (20) one or more impact sensors; (21) one or more wireless communication sensors (e.g., a Bluetooth chip); (22) one or more tear sensors; (23) one or more olfactory sensors; and/or (24) any other suitable one or more sensors. In particular embodiments, the one or more sensors comprise a pulse oximeter, a front-facing camera, an eye-facing camera, an accelerometer and a gyroscope.

In particular embodiments, the system is configured to receive input from a user (e.g., a wearer of the eyewear) via one or more gestures, for example, using at least one of the sensors described immediately above. In various embodiments, the system may, for example, be configured to: (1) identify a gesture performed by the user; and (2) at least partially in response to identifying the gesture, perform a function associated with the gesture. In particular embodiments, the system may be configured to perform a particular function in response to identifying a particular gesture, where the particular gesture is associated with the particular function. In particular embodiments, the system may be configured to enable the user to provide one or more gestures for performing a particular function. In such embodiments, the system may, for example: (1) receive a selection of a particular function from the user; (2) receive input of one or more gestures from the user; and (3) associate the particular function with the one or more gestures.

Second Temple

In various embodiments, the second temple 114 substantially mirrors the shape of the computerized temple 102. Thus, for purposes of ease of understanding and clarity, only certain parts will be discussed to highlight the differences in the structure and operation of the embodiment shown in FIGS. 1-3. As shown in FIGS. 2 and 3, the second temple 114 is adjacent the frame second end 116 and substantially parallel to the computerized temple 102. The second temple 114 extends substantially rearward from the eyewear frame 108 adjacent the frame second end 116. As shown in FIG. 2, similar to the computerized temple 102, the second temple 114 includes a first end 114a and a second end 114b. An earpiece 114c is proximate the second end 114b. A second temple hinge connection 204 is proximate the first end 114a. Connection of the second temple 114 to the frame 108 is carried out in a similar manner to that described with respect to the first computerized temple 102.

In some embodiments, the second temple 114 may be different in form and shape from that of the computerized temple 102. For example, the second temple may be thinner in cross section along its length or made from a different material. In still other embodiments, the second temple may be shorter or longer in length as compared to the computerized temple 102. Thus, depending on the application of the computerized temple, the first and second temples may be substantially the same or they may be different. For example, in some embodiments, the computerized temple may be a replacement temple that is attached to a prefabricated standard eyewear frame. That is, a user may purchase the computerized temple and then attach the computerized temple 102 to an already existing pair of prescription frames thereby converting the preexisting prescription eyewear into computerized eyewear. In other embodiments, the computerized temple 102 may come pre-attached to a standard pair of non-computerized frames where the first and second temples are identical in form and color.

Computerized Temple Construction

Figure 4:
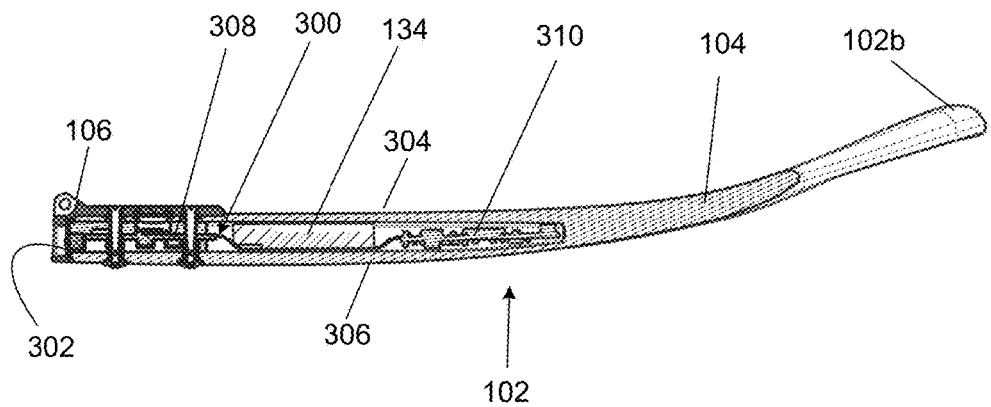
FIG. 4 is a partial sectional view of the computerized temple of FIG. 2.
Figure 5:
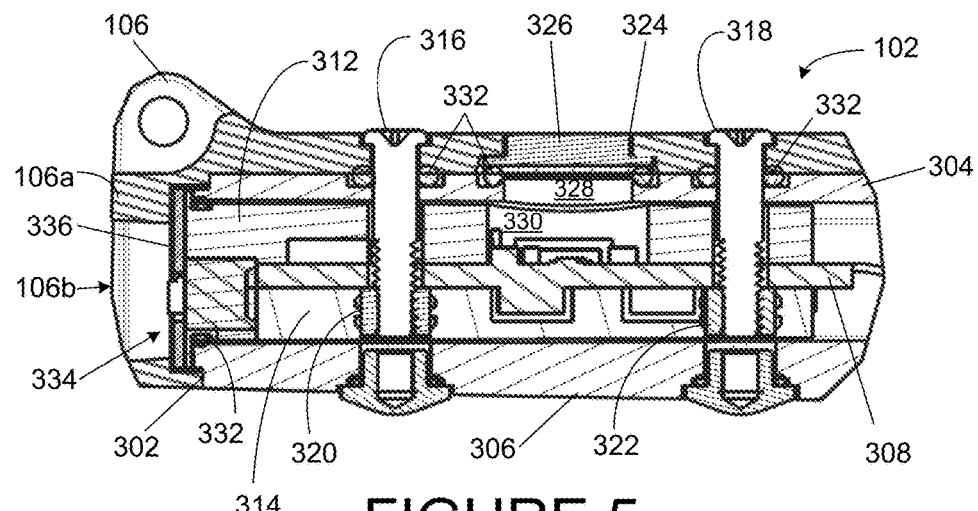
FIG. 5 is a partial sectional view of the electronic components in the computerized temple of FIG. 2, showing how the closure is secured to the temple.
Figure 6:
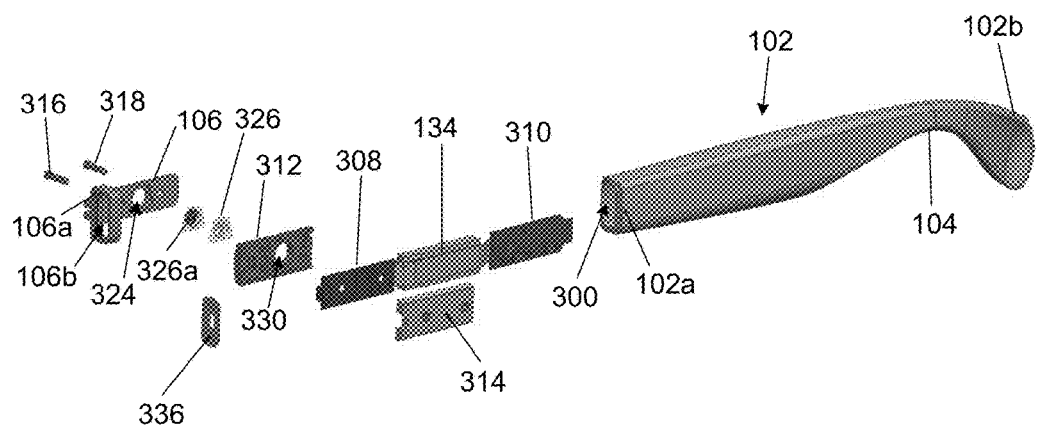
FIG. 6 is an exploded view of the computerized temple of FIG. 2.

Referring to FIGS. 4-6, the computerized temple 102 is shown with all electronic components received in a cavity 300 (e.g., a blind bore) formed through a surface 302 of the first end 102a of the computerized temple 102. In various embodiments, the cavity 300 is formed through the surface 300 and extends from the computerized temple first end 102a toward to the computerized temple second end 102b. The cavity 300 is formed intermediate a first side wall 304 and a second side wall 306 of the computerized temple elongated body.

In various embodiments, the electronic components that are received in the cavity 300 of the computerized temple 102 are formed from one or more circuit boards 308 and 310 and the power source 134 that are operatively coupled to one another. The electronic components may be mounted in cavity 300 in any suitable manner, as further described herein. Referring particularly to FIG. 5, one of the one or more circuit boards 308 is shown positioned intermediate a first half-lock block 312 and a second half-lock block 314. The first and second half-lock blocks 312 and 314 together with the circuit board 308 are sized and shaped to fit securely in the blind bore 300 (FIGS. 4 and 6) so that the electronic components do not slide in the blind bore. One or more fasteners 316 and 318 pass through the hinge portion 106 and the first side wall 304. The fasteners 316 and 318 also pass through the first half-lock block 312 and the circuit board 308 and are secured to the second half-lock block 314 by a suitable fastening mechanism 320 and 322 such as threads, pins, etc. formed in the second half-lock block 314.

In various embodiments, the hinge portion 106 further comprises a partial closure 106a that is received over the first temple end 102a. The partial closure 106a defines an opening 106b that covers the temple first end 102a and also houses a charging port. In various embodiments, the charging port comprises a paramagnetic plate, as described in greater detail herein. The charging port is operatively coupled to one or more of the processor and the power source and allows a user to recharge the power source.

The hinge portion/closure 106 further defines an opening 324 (FIGS. 5 and 6) formed there through that is configured to receive one or more of a light, a touch button, or any other input/output device 326. In various embodiments where the input/output device 326 includes a light, a diffuser layer 326a may be placed over the light. Similar openings 328 and 330 are also formed respectively through the first side wall 304 and the first half-lock block 312. The openings 328 and 330 facilitate connection of the input/output device 326 to the various other electrical components. In preferred embodiments, one or more O-rings 332 are used to create a water tight seal at various connection points. The O-rings may be formed from any polymer, rubber or suitable material.

In other embodiments, some or all of the electronic components may be partially or fully encased in a polymer material. For example, some or all of the electronic components may be encased in a polymer that is shaped to fit in the blind bore 300. In other embodiments, the electronic components may be placed intermediate one or more first and second half-locks so that the sandwiched electronic components are moveable with respect to each other pair of half-locks. These alternative configurations may allow for the electronic components to fit more snuggly in the length of the blind bore 300.

Recharging Port

In various embodiments and as described above, the computerized temple 102 contains a power source 134 (FIG. 1). In some embodiments, the power source 134 comprises at least a rechargeable battery such as a rechargeable alkaline battery, a nickel metal hydride (NiMH) battery, a lithium ion (Li-ion) battery, a lithium ion polymer (Li-ion polymer) battery, a nickel cadmium (NiCd) battery, a Nickel zinc battery, a Nickel-Iron battery, or any other suitable rechargeable type battery. In various embodiments, the power source 134 may comprise multiple rechargeable batteries.

Referring to FIGS. 5 and 6, in various embodiments, the power source may be recharged by connecting a recharging cable (not shown) into a charging port 334 located in opening 106b. The charging port 334 is partially formed by opening 106b that is configured to receive a male portion of a charging cable connector (not shown). In various embodiments, the charging port 334 may take the form of various female connectors such as a micro universal serial bus (USB) female socket, a mini USB female socket, a LIGHTENING® socket, or any other suitable charging configuration. In other embodiments, the charging port may comprises a mechanical charging port such as a snap-fit, pressure fit or other mechanical charging system.

In particular embodiments, the charging port 334 contains a plate 336 formed from a magnetic, ferromagnetic or paramagnetic material. In embodiments where a magnetic or paramagnetic material is used for the plate 336, the charging connector may be formed from a magnetic material. In this way, when the charging cable comes into close proximity to the charging port 334, the magnetic male portion of the cable is attracted to the plate 336 so that the charging connector engages with and stays coupled to the charging port 334 until a sufficient force is applied to separate the charging connector from the charging port 334.

In various embodiments, the plate 336 may be made from a polymer material that forms a front wall of the blind bore 300 (FIGS. 4 and 6) thereby forming a closure over the blind bore 300. In various embodiments, use of a paramagnetic material is beneficial since it only exhibits magnetic properties when it is in the presence of a magnetic field. Therefore, if the computerized temple contains sensitive magnetic sensors, the paramagnetic material in the charging port 334 will not interfere with the operation of the various sensors since the paramagnetic material loses its magnetism as soon as the magnetic cable is removed. In various embodiments, the plate 336 may also be formed from a material that turns magnetic when coupled to an electrical source (e.g., an electromagnetic material). In these embodiments, the plate 336 becomes magnetic when the charging cable is couple to the charging port 334 as electricity is passed through the plate 336.

Method of Assembling the Computerized Temple

Figure 7A:
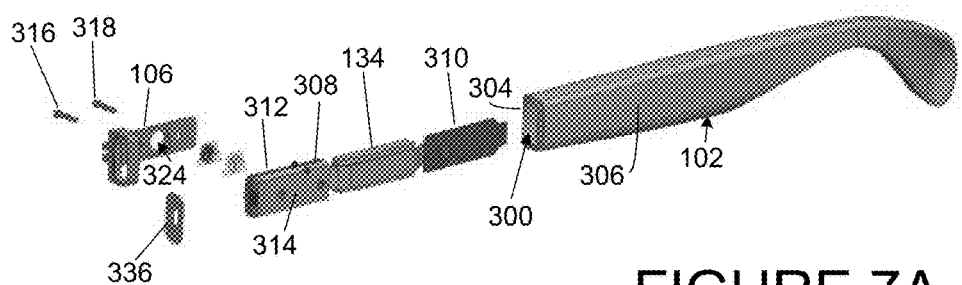
FIGS. 7A-7E are partial perspective views of the computerized temple of FIG. 2 illustrating how the electronics are secured in the temple.
Figure 7B:
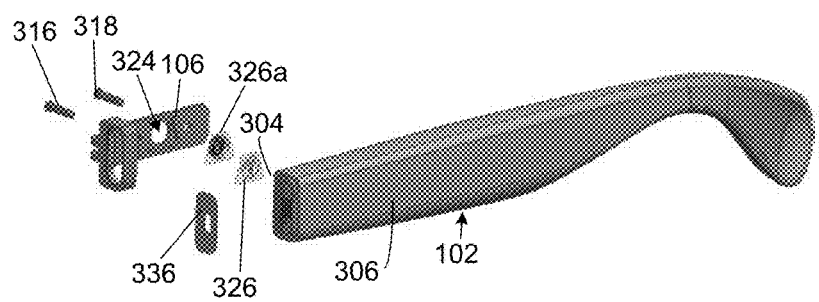
Figure 7C:
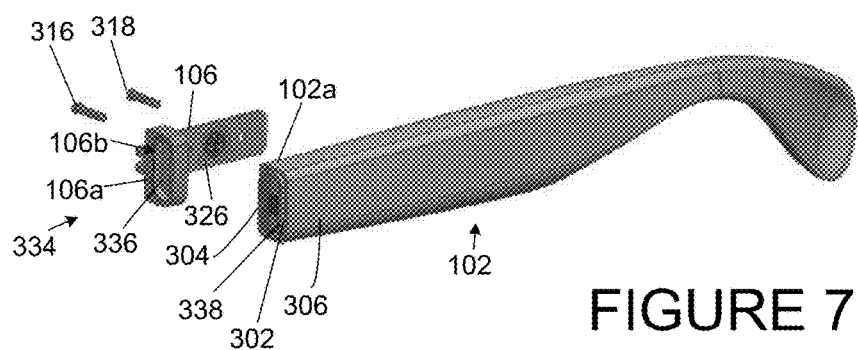

Assembly of the computerized temple is illustrated in FIGS. 7A-7E. In particular and referring to FIG. 7A, the first half-lock block 312 and the second half-lock block 314 are shown on opposite sides of the circuit board 308 (i.e., the half-lock blocks sandwich over the front circuit boards). Referring to FIG. 7B, the electrical components (e.g., the first circuit board 308, the second circuit board 310 and the power source 134 are next slid into the blind bore 300 so that the first and second half-lock blocks align with the first and second side walls 304 and 306 that defines the inside walls of the blind bore 300. Referring to FIG. 7C, the diffuser 326a and the input/output device 326 (e.g., a LED) are stacked and placed into the opening 324 in the hinge 106. Moreover, the paramagnetic plate 336 is mounted in the hinge closure portion 106a so that the paramagnetic plate is accessible through the closure opening 106b. As such, the paramagnetic plate 336 together with the hinge closure portion 106a and the closure opening 106b form the charging port 334.

Figure 7D:
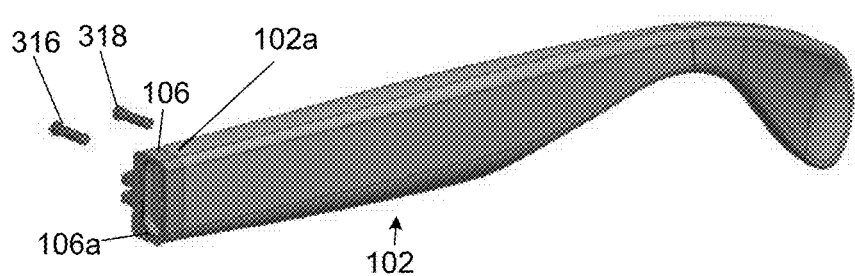
Figure 7E:
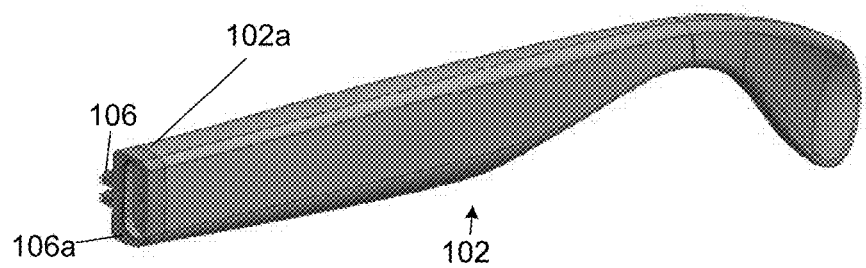

Referring to FIGS. 7C and 7D, the hinge 106 is coupled to the temple first end 102a by sliding the closure portion over the temple first end 102a until the hinge closure portion 106a seats on a boss 338 that is formed on the temple first end wall surface 302. In various embodiments, the boss may be formed completely by the material used to form the temple 102. In other embodiments, the boss 338 may be formed from a combination of the temple first end 102a and the first and second half-lock blocks 312 and 314. In any case, the hinge is slid onto the temple first end 102a until it is fully seated. Finally, referring to FIGS. 7D and 7E, once the hinge 106 is fully seated on the temple first end 102a, the fasteners 316 and 318 are threaded into the second half-lock block and tightened. In this configuration, the temple 102 is now ready to be pivotally attached to a frame front of eyewear to form computerized eyewear.

Exemplary Computing Device Architecture

Figure 8:
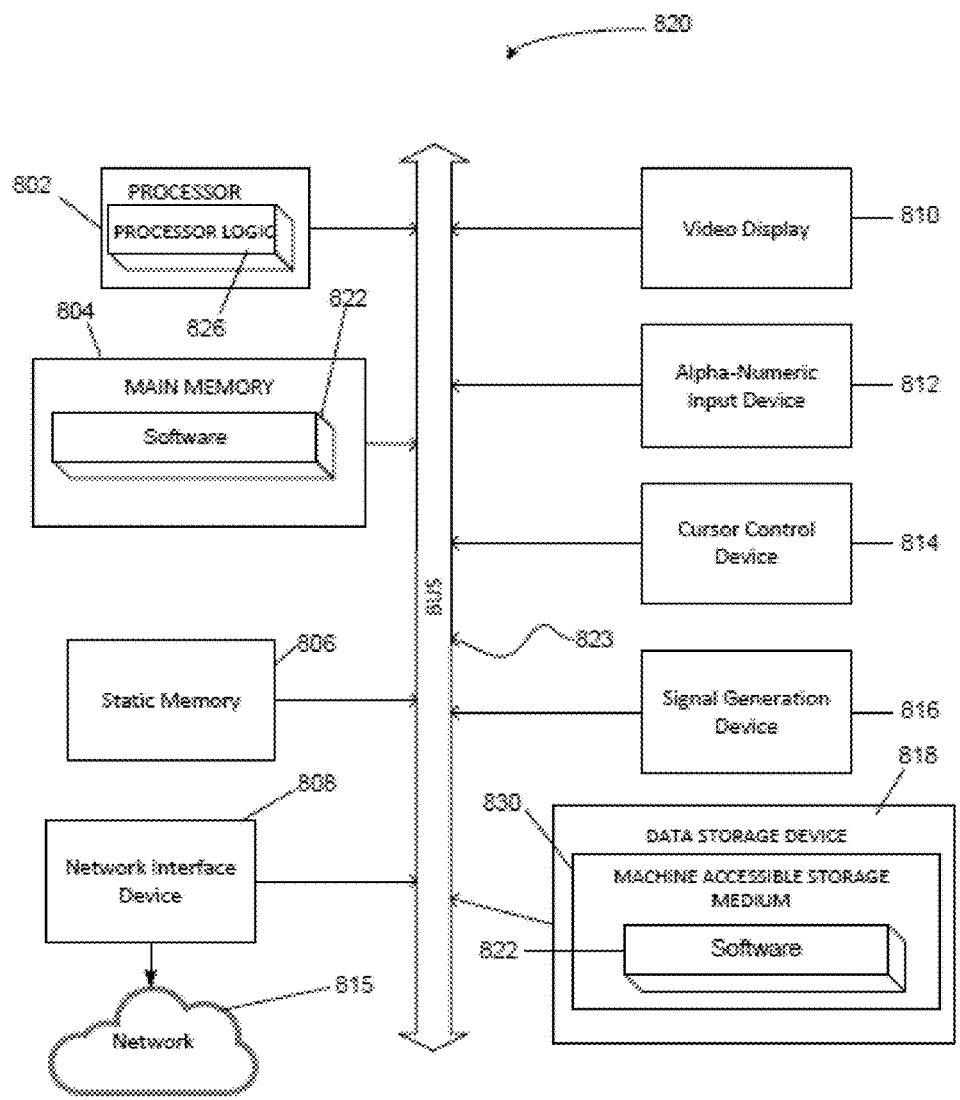
FIG. 8 depicts exemplary system architecture for an example computing device for use in the computerized eyewear of FIG. 1.

FIG. 8 illustrates a diagrammatic representation of a computer architecture 820 that can be used within a computerized temple (e.g., computerized temple 102 of FIG. 2) as the at least one processor 132. In particular embodiments, the computing device 820 may be connected (e.g., networked) to other computing devices in a LAN, an intranet, an extranet, wirelessly (e.g., via WIFI), via Bluetooth, and/or the Internet. As noted above, the computing device 820 may operate in the capacity of a server or a client computing device in a client-server network environment, or as a peer computing device in a peer-to-peer (or distributed) network environment. Further, while only a single computing device is illustrated, the term "computing device" shall also be interpreted to include any collection of computing devices that individually or jointly execute a set (or multiple sets) of instructions to perform any one or more of the methodologies discussed herein.

An exemplary computer device 820 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 823.

The processing device 802 represents one or more general-purpose or specific processing devices such as a microprocessor, a central processing unit (CPU), or the like. More particularly, the processing device 802 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 may be configured to execute processing logic 826 for performing various operations and steps discussed herein.

The computing device 820 may further include a network interface device 808. The computing device 820 may also include a video display unit 610 (e.g., a liquid crystal display (LCD) or a cathode ray tube (CRT)), an alpha-numeric input device 812 (e.g., a keyboard), a cursor control device 814 (e.g., a mouse), and a signal generation device 816 (e.g., a speaker).

The data storage device 818 may include a non-transitory computing device-accessible storage medium 830 (also known as a non-transitory computing device-readable storage medium, a non-transitory computing device-readable medium, or a non-transitory computer-readable medium) on which is stored one or more sets of instructions (e.g., software 822) embodying any one or more of the methodologies or functions described herein. The one or more sets of instructions may also reside, completely or at least partially, within the main memory 804 and/or within the processing device 802 during execution thereof by the computing device 820—the main memory 804 and the processing device 802 also constituting computing device-accessible storage media. The one or more sets of instructions may further be transmitted or received over a network 815 via a network interface device 808.

While the computing device-accessible storage medium 830 is shown in an exemplary embodiment to be a single medium, the term "computing device-accessible storage medium" should be understood to include a single medium or multiple media (e.g., a centralized or distributed database, and/or associated caches and servers) that store the one or more sets of instructions. The term "computing device-accessible storage medium" should also be understood to include any medium that is capable of storing, encoding, or carrying a set of instructions for execution by the computing device and that causes the computing device to include any one or more of the methodologies of the present invention. The term "computing device-accessible storage medium" should accordingly be understood to include, but not be limited to, solid-state memories, optical and magnetic media, etc.

Alternative Embodiment Having a Second Computerized Temple with Sensors

Figure 9:
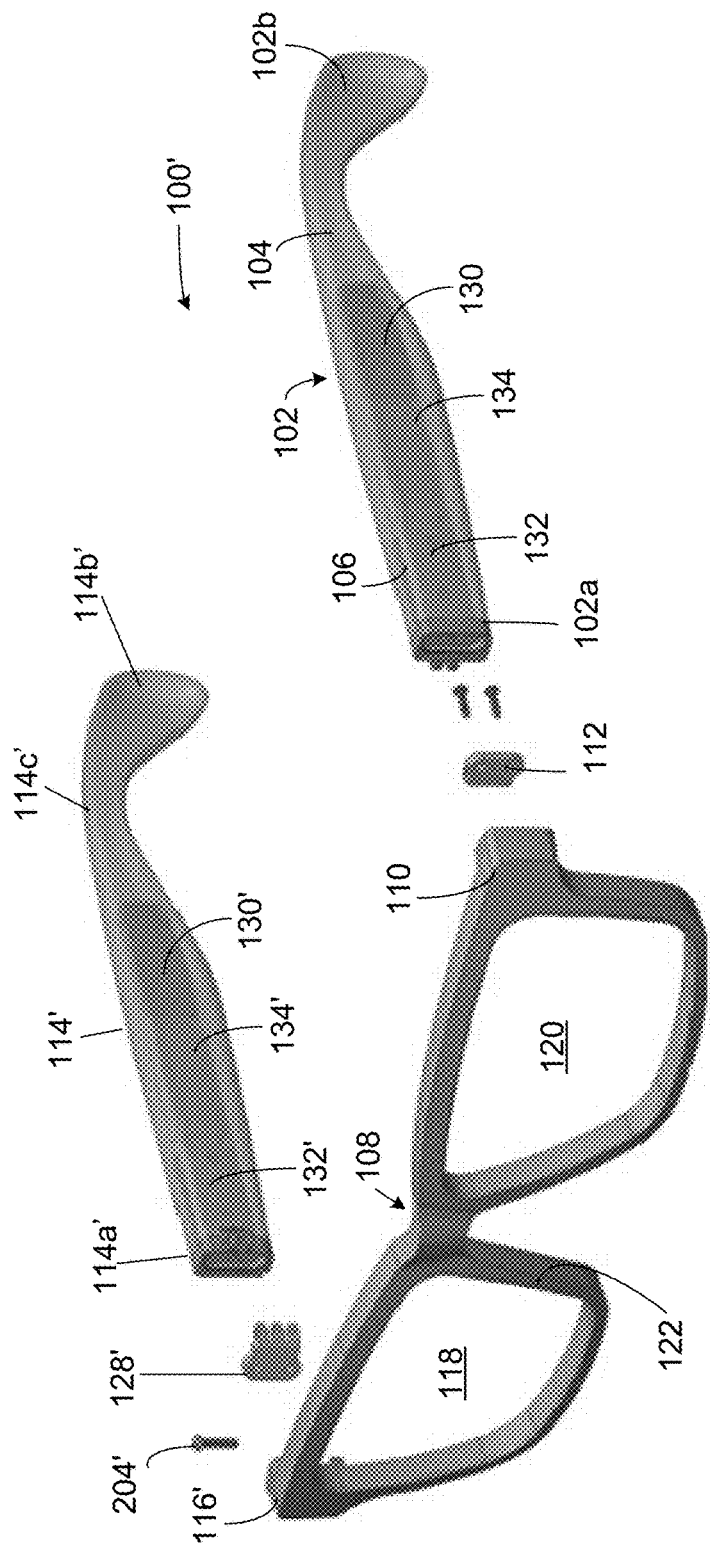
FIG. 9 depicts an exploded view of an alternative embodiments of a computerized eyewear using multiple computerized temples.

FIG. 9 illustrates an alternative embodiment of computerized eyewear 100' that is similar to the computerized eyewear 100' of FIGS. 1-3. For purposes of ease of understanding and clarity, only certain parts will be discussed to highlight the differences in the structure and operation of the embodiment shown in FIG. 9 as compared to the embodiments shown in FIGS. 1-3. As shown in FIG. 9, eyewear 100', according to various embodiments, includes: (1) an eyewear frame 108; (2) a first computerized temple 102; and (3) a second computerized temple 114'.

The eyewear frame 108 may be a standard eyewear frame already owned by the wearer. Similar to the eyewear 100 shown in FIGS. 1-2, the eyewear frame 108 has a first end 110 and a second end 116'. In this embodiment, the second temple 114 shown in FIGS. 1-3 is replaced with a second computerized temple 114' that includes one or more sensors 130' coupled (embedded in, coupled to, operatively coupled to, etc.) to the second computerized temple 114'. The one or more sensors 130' may include the same sensors as the eyewear 100 of FIGS. 1-3. Thus, similar to the eyewear 100 of FIGS. 1-3, the one or more sensors 130' are configured to detect at least one of a physiological characteristic and/or an environmental characteristic associated with the wearer of the computerized eyewear retrofit kit. In some embodiments, the one or more sensors 120' may comprise one or more speakers, one or more microphones, one or more gyroscopes, or one or more of any other type of sensor. In addition to the one or more sensors 130', the second computerized temple 114' may further comprise one or more auxiliary processors 132' (e.g., microprocessor, digital media processor, WiFi/Bluetooth chip, analog-to-digital converter, integrated power-management integrated circuit, etc.) and one or more auxiliary power sources 134'. The one or more auxiliary processors 132' and auxiliary power sources 134' may be charged similar to that described with respect to the first computerized temple 102 by coupling a charging cable to a charging port located at a first end of the second computerized temple 114a', or it may be charged via an electrical connection between the first and second computerized temples 102 and 114'.

In various embodiments, the second computerized temple 114' may be operatively coupled to the first computerized temple 102 via a wireless connection (e.g., WiFi, Bluetooth, near-field communications, etc.). In other embodiments, the second computerized temple 114' may be operatively coupled to the first computerized temple 102 via a hardwire connection. For example, the first end of the first computerized temple 102a may plug into a connector (not shown) built into the frame front 108 that coupled to a second connector formed at the second end 116' of the frame front 108 so that the second connector plugs into the charging port located at the first end 114a' of the second computerized temple 114'. In this way, the first and second computerized temples 102 and 114' are in a position in which they are perpendicular to the back of the frame front 108, each connector is plugged into the charging port thereby forming an electrical connection between the first and the second computerized temples 102 and 114'. It should be understood that an electrical connection between the first computerized temple 102 and the second computerized temple 114' may be carried out in any other suitable method, for example, by a wire coupled between the first and second computerized temples.

Similar to the eyewear 100 of FIGS. 1-3, the one or more sensors 130' may be coupled to the second computerized temple 114' in any suitable way. For instance, the one or more sensors 130' may be embedded into the second computerized temple 114', coupled to the second computerized temple 114', and/or operatively coupled to the second computerized temple 114'. In particular embodiments, the one or more sensors 130' are operatively coupled to the first computerized temple 102. In various embodiments, the one or more sensors 130' may be formed at any point along the second computerized temple 114'. For instance, a temperature sensor may be disposed adjacent the inner (back) surface of the second computerized temple 114' proximate to the earpiece 114c'. In various embodiments, the one or more sensors 130' may be formed in any shape. In addition, the one or more sensors 130' may be formed on the inner (back) or outer (front) surface of the second computerized temple 114'.

Similar to the eyewear found in FIGS. 1-3, the first computerized temple 102 and the second computerized temple 114' have a first and a second temple hinge connection 102a, 114a', respectively. The first temple hinge connection 102a is adapted to be releasably coupled to a first frame connection receiving end 112 proximate the frame first end 110 by any suitable first hinge connection. The second temple hinge connection 114a' is adapted to be releasably coupled to a second frame connection receiving end 128' proximate the frame second end 116' by any suitable second hinge connection 204'.

Computerized Eyewear Having Voice Controlled Intelligent Personal Assistant Functionality In various embodiments, the computerized eyewear discussed above further comprises functionality to provide voice-controlled intelligent personal assistant services. That is, the computerized eyewear can be placed into a default mode where the computerized eyewear continuously monitors all speech for a wake word to be spoken by the wearer. Once the wake word is spoken, the system can either prompt the user for a question or respond to the next question or command received by the wearer. In other modes, the wearer may manually wake the voice-controlled intelligent personal assistant services or use a voice-activated remote control. In particular embodiments, the computerized eyewear further comprises a digital media processor, a wireless and/or Bluetooth chip, a programmable LED driver, a low power stereo audio analog-to-digital converter and an integrated power-management integrated circuit, one or more microphones and one or more speakers.

In particular embodiments, the computerized eyewear is configured to wirelessly connect to a cloud based server system such that as the computerized eyewear receives voice recordings of the wear, the recording is sent to the remote service so that the recording can be analyzed to determine an appropriate answer or response. Examples of cloud based server systems includes, but are not limited to, Amazon Voices Services, Google Assistant, Google Now, Cortana intelligent personal assistant, and Siri intelligent personal assistant. In other embodiments, the questions or commands that are received by the computerized eyewear can be analyzed locally by the processor and other electronics in the computerized eyewear and an appropriate answer or response may be determined in real-time by the computerized eyewear as discussed in greater detail herein.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of Internet-implemented computer software. Any suitable computer-readable storage medium may be utilized including, for example, hard disks, compact disks, DVDs, optical storage devices, and/or magnetic storage devices.

Various embodiments are described below with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the computerized eyewear, partly on the computerized eyewear, as a stand-alone software package, partly on the computerized eyewear and partly on a remote computer, or entirely on the remote computer or server. In the latter scenario, the remote computer may be connected to the computerized eyewear through any type of network, including but not limited to: (1) a local area network (LAN); (2) a wide area network (WAN); (3) a cellular network; (4) the connection may be made to an external computer (for example, through the Internet using an Internet Service Provider); or over a Bluetooth connection.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

Figure 10:
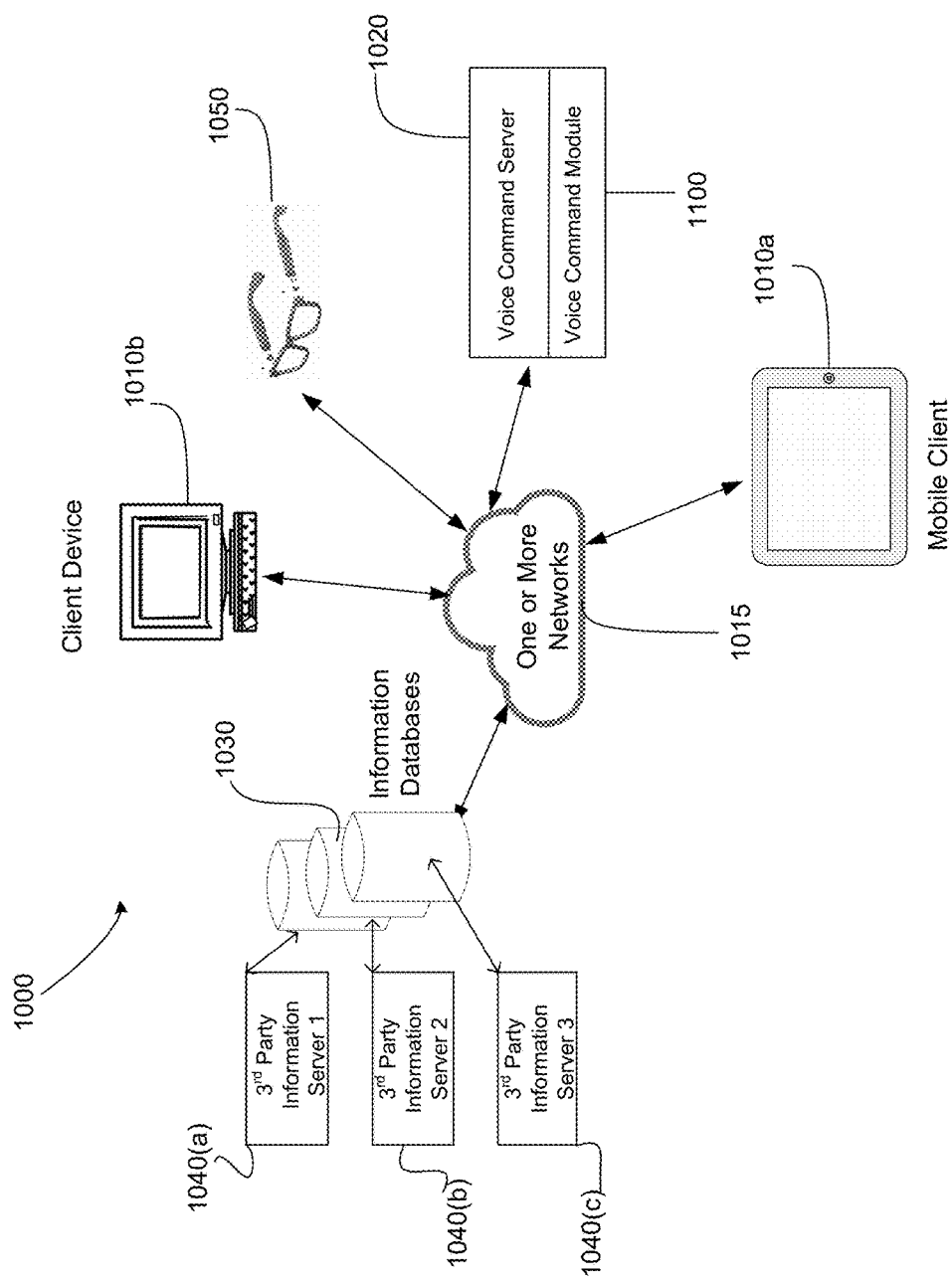
FIG. 10 depicts a block diagram of a voice controlled intelligent personal assistant services associated with the computerized eyewear of FIGS. 1 and 9, and in accordance with an embodiment of the present system.

FIG. 10 is a block diagram of a Voice-Controlled Intelligent Personal Assistant System 1000 according to particular embodiments. As may be understood from this figure, the Voice-Controlled Intelligent Personal Assistant System 1000 includes One or More Networks 1015, a Voice Command Server 1020 that includes a Voice Command Module 1100, Information Databases 1030, One or More Remote Computing Devices 1010a and 1010b (e.g., such as a smart phone, a tablet computer, a wearable computing device, a laptop computer, a desktop computer, a Bluetooth device, an automated dialing apparatus, etc.), and One or More Computerized Eyewear Devices 1050, which may, for example, be embodied as one or more of eyewear, headwear, clothing, a watch, a hat, a helmet, a cast, an adhesive bandage, a piece of jewelry (e.g., a ring, earring, necklace, bracelet, etc.), or any other suitable wearable device. In particular embodiments, the one or more computer networks 1015 facilitate communication between the Voice Command Server 1020, the Information Databases 1030, the One or More Remote Computing Devices 1010a and 1010b, and the one or more Computerized Eyewear Devices 1050.

The one or more networks 1015 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computing devices). The communication link between the Computerized Eyewear Devices 1050 and the Voice Command Server 1020 may be, for example, implemented via a Local Area Network (LAN) or via the Internet.

Exemplary System Platform

As noted above, a system, according to various embodiments, is adapted to receive voice commands from a wearer of the one or more computerized eyewear devices 1050, decipher the voice commands, determine one or more actions to take based on the voice commands and then carry out the one or more actions in response to the voice commands. Various aspects of the system's functionality may be executed by certain system modules, including the Voice Command Module 1100. The Voice Command Module 1100 is discussed in greater detail below.

Voice Command Module

Figure 11:
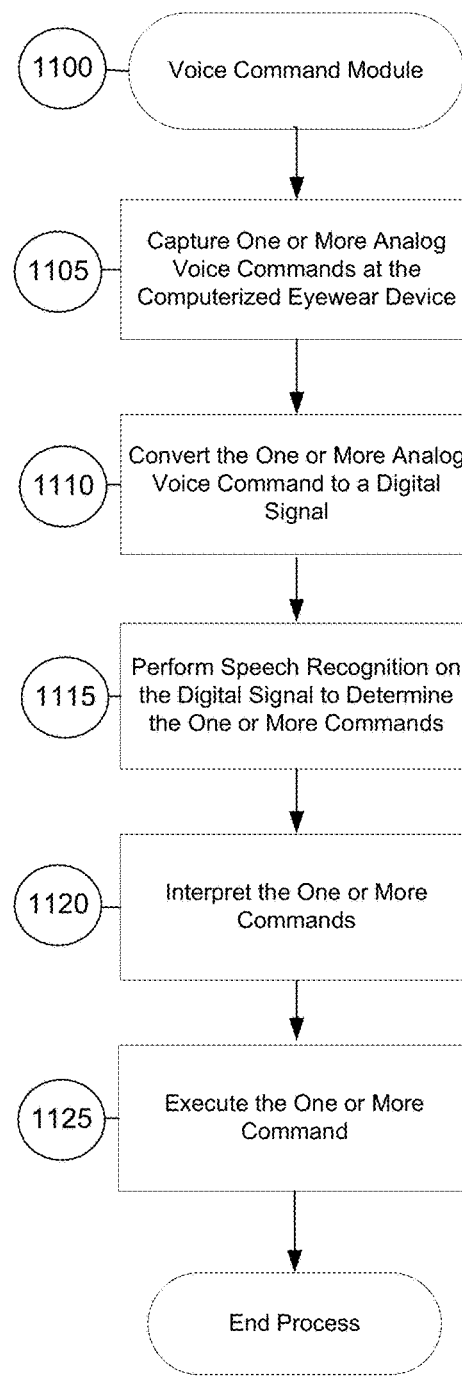
FIG. 11 depicts a flowchart that generally illustrates various steps executed by a Voice Command Module according to particular embodiments.

FIG. 11 is a flow chart of operations performed by an exemplary Voice Command Module 1100, which may be run on the computerized eyewear device 1050 or on a remote voice command server 1020. In particular embodiments, the Voice Command Module 1100 may capture a voice command from the wearer, analyze the voice command to determine what command the wearer is requesting and execute the command. This may be performed locally by the computerized eyewear, remotely by the voice command server or through a combination of the computerized eyewear and the voice command server.

The system begins, in various embodiments, at step 1105 when the computerized eyewear is activated either automatically when it recognizes the a "wake" word spoken by the wearer or manually when the wearer activates the voice command service (e.g., by pressing a button on the computerized eyewear, via a button on a remote control operatively coupled to the computerized eyewear, etc.). Once the voice command service has been awoken, the computerized eyewear monitors the wearer's speech for one or more commands (e.g., requests to take action, questions, etc.). In various embodiments, the computerized eyewear may capture the wearer's words in real-time as they are spoken. In other embodiments, the wearer's spoken words may be captured by recording them in memory.

At step 1110, the computerized eyewear converts the captured analog speech into one or more digital signals using a analog-to-digital converter. Once the captured speech is converted into a digital signal, at step 1115 the digital signal is put through a speech recognition and natural language understanding engines. That is, the one or more processors on the computerized eyewear utilizes algorithms through acoustic and language modeling to translate the spoken words into text. The computerized eyewear, at step 1120 interprets the one or more commands by evaluating the text extracted from the spoken one or more commands. The interpreted commands can include any one or more commands for using the computerized eyewear, questions to be answered through online web searches or entries into one or more applications associated with the computerized eyewear. At step 1125, the computerized eyewear executes the one or more interpreted commands.

For example, if the command is "what is the nearest grocery store?", the computerized eyewear may carry out a Google® search to determine the closest grocery store and then provide a reply to the wearer via synthesized speech via a speaker operatively coupled to the computerized eyewear. If for example, the command is to record the medicine being taken by the wearer, the computerized eyewear could capture images of the medicine bottle being held by the wearer and then capture images of the medicine in the hand of the wearer. In this way, the system can analyze the captured images to determine the type and name of the medicine the wearer is taking and the quantity of medicine consumed by the wearer. The information may then be used by the computerized eyewear to track the user's compliance with a medicine regime.

In another example, the wearer can provide one or more commands to tell the computerized eyewear to capture data associated with exercise that is being performed by the wearer. For example, the wearer can tell the computerized eyewear to start collecting movement data, heartrate data and other physiological metrics associated with the wearer because the wearer is beginning to run. Thus, while the wearer is running, the computerized eyewear would use the various sensors contained in the computerized eyewear to capture physiological data associated with the wearer. Once the wear is finished exercising, the wearer can provide one or more commands to tell the computerized eyewear that the wearer has stopped the exercise. Based on the commands, the computerized eyewear can stop capturing the metrics or execute any other commands that are associate with the end of exercise, such as synching the physiological metrics captured while exercising with data collected by an application for tracking the information.

In yet other embodiments, the computerized eyewear can be operatively coupled to one or more other computer devices 1010a, 1010b, which may be a home automation computer, an electronic door lock computer system, an automobile computer system, etc. In various embodiments, the computerized eyewear system can validate the identity of the wearer via voice recognition or through some other identity recognition technology (e.g., biometrics, etc.). Once verified, the wearer can use voice commands that are captured, interpreted and executed by the one or more other computer devices in order to carry out functionality controlled by the one or more other computer devices 1010a, 1010b. For example, in the case where the computerized eyewear is operatively coupled to an automobile computer system, the user can use voice commands that are captured by the computerized eyewear, interpreted, and the commands may then be passed to the automobile computer system. Thus, the wearer may use one or more voice commands to unlock their automobile doors, start the car, change the radio station, turn on the air conditioner or carry out any other activity using voice commands that are captured by the computerized eyewear.

In the case of a home automation system, the wearer of the computerized eyewear may control, through the capture of voice commands by the computerized eyewear, lights, climate control, alarm systems or any other automated systems in the house. Additionally, the user may unlock electronic doors via their computerized eyewear. In still other embodiments, the computerized eyewear may execute a voice command such as "search for restaurants near me" and play an audio list of the search results. In other embodiments, the computerized eyewear may carry out the search and then ask whether the wearer would like to transfer the results to a mobile computing device that is operatively coupled to the computerized eyewear such as a smartwatch, a smartphone, a tablet or any other handheld computing device having a display. Thus, it should be understood that the computerized eyewear may have the processing ability to execute the interpreted commands, including searching the internet via a cellular connection, a WiFi connection or via any other network connection and then pass the results to another computing device. In the alternative, the computerized eyewear may also act as an input device for entering data on a handheld computing device that performs the search.

CONCLUSION

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. For example, the computerized eyewear described in these embodiments may include any other suitable eyewear, such as, for example, ski or swim goggles, sunglasses, safety goggles or glasses, etc. Moreover, in various embodiments, instead of interpreting the voice commands locally on the computerized eyewear, the voice commands may be transmitted to a cloud service that interprets the voice commands and then returns commands to be locally executed by the computerized eyewear. Therefore, it is to be understood that the invention is not to be limited to the specific embodiments disclosed herein, and that the modifications and other embodiments are intended to be included within the scope of the appended exemplary concepts. Although specific terms are employed herein, they are used in a generic and descriptive sense only and not for the purposes of limitation.

What is claimed is:

1. A computerized eyewear temple for use with a frame having at least one lens to form computerized eyewear, the computerized temple comprising:
   a. an elongated body having:
      i. a first end defining a first end wall;
      ii. a second end defining a second end wall;
      iii. a first side wall that extends between the first end and the second end;
      iv. a second side wall that extends between the first end and the second end; and
      v. a blind bore formed in the first end wall that extends from the first end toward the second end;
   b. at least one processor;
   c. one or more sensors operatively coupled to the at least one processor; and
   d. a power source operatively coupled to the at least one processor and the one or more sensors,
      wherein
         i. the temple body first end is configured to be releasably attached to an end of a frame; and
         ii. the at least one processor and the power source are configured to be inserted into the blind bore formed in the first end wall.

2. The computerized eyewear temple of claim 1, further comprising a closure that coupled to the elongated body first end such that the closure at least partially covers a portion of the blind bore formed in the first end wall.

3. The computerized eyewear temple of claim 2, wherein the closure is a portion of a hinge that rotationally couples the elongated body to the frame.

4. The computerized eyewear temple of claim 3, wherein the closure forms a charging port for recharging the power source.

5. The computerized eyewear temple of claim 3, further comprising:
   a. an opening formed through the portion of a hinge; and
   b. a light positioned in the opening,
   wherein the light is operatively coupled to the at least one processor.

6. The computerized eyewear temple of claim 3, further comprising a charging port connection that is operatively coupled to at least one of the at least one processor or the power source, wherein the charging port connection is accessible through the closure to allow a user to charge the power source.

7. The computerized eyewear temple of claim 6, wherein the charging port connection is hidden when the computerized eyewear temple is coupled to a frame and positioned perpendicular to the frame.

8. The computerized eyewear temple of claim 1, wherein the one or more sensors are configured to be received in the blind bore.

9. The computerized eyewear temple of claim 1, further comprising:
   a. a first half-lock; and
   b. a second half-lock spaced apart from the first half-lock,
   wherein at least one of the at least one processor or the power source is received intermediate the first and second half-locks such that when the first and second half-locks are placed into the elongated body blind bore, the first and second half-locks securely maintain the at least one of the at least one processor or the power source in the elongated body blind bore and prevent the at least one of the at least one processor or the power source from sliding or rotating in the elongated body blind bore.

10. Computerized eyewear comprising:
   a. a frame having:
      i. a first end,
      ii. a second end,
      iii. a front surface that extends between the first frame end and the second frame end; and
      iv. a rear surface that extends between the first frame end and the second frame end;
   b. a computerized temple comprising an elongated body having:
      i. a first end defining a first end wall, wherein the elongated body first end is pivotally coupled to the frame first end;
      ii. a second end defining a second end wall, wherein the second end is configured to rest on an ear of a wearer of the computerized eyewear;
      iii. a first side wall that extends between the first end and the second end;
      iv. a second side wall that extends between the first end and the second end; and
      v. a blind bore formed in the first end wall that extends from the first end toward the second end;
   c. at least one processor received in the blind bore formed in the first end wall of the elongated body;
   d. a power source received in the blind bore, wherein the at least one processor is operatively coupled to the power source; and
   e. at least one sensor operatively coupled to the at least one processor,
      wherein
         the blind bore is configured so that the power source can be inserted into the elongated body through the blind bore, and the at least one sensor is either operatively coupled to one of the frame or the elongated body or received in the blind bore.

11. The computerized eyewear of claim 10, further comprising a charging socket positioned at least partially over the blind bore formed in the first end of the elongated body, wherein the charging socket is operatively couple to the power source.

12. The computerized eyewear of claim 11, wherein the charging socket further comprises a portion of a hinge that is used to rotationally couple the computerized temple to the frame.

13. The computerized eyewear of claim 11, wherein the charging socket is hidden from view when the first temple is positioned substantially perpendicular to the frame rear surface.

14. The computerized eyewear of claim 10, further comprising a first half-lock and a second half-lock, wherein at least one of the at least one processor or the power source is received intermediate the first and second half-locks such that when the first and second half-locks are placed into the blind bore, the first and second half-locks maintain the at least one of the at least one processor or the power source securely in the elongated body blind bore.

15. A computerized temple for use with a frame to form computerized eyewear, the computerized temple comprising:
  a. an elongated body having:
    i. a first end defining a first end wall, wherein the elongated body first end is configured to be pivotally coupled to a frame first end;
    ii. a second end defining a second end wall, wherein the second end is configured to rest on an ear of a wearer;
    iii. a first side wall that extends between the first end and the second end;
    iv. a second side wall that extends between the first end and the second end; and
    v. a blind bore formed in the first end wall that extends from the first end toward the second end intermediate the first and the second side walls;
  b. electronic components received in the blind bore formed in the first end wall of the elongated body; and
  c. a closure at least partially received on the elongated body first end,
  wherein the closure pivotally couples the elongated body first end to the frame.

16. The computerized temple of claim 15, wherein the closure further comprises a portion of a hinge that is used to pivotally couple the elongated body first end to the frame.

17. The computerized temple of claim 15, further comprising:
  a. a first half-lock; and
  b. a second half-lock;
  wherein
    a portion of the electronic components are positioned intermediate the first half-lock and the second half-lock, and
    the first and second half-locks are used to secure the electronic components within the blind bore.

18. The computerized temple of claim 17, further comprising one or more fasteners, wherein
  a. the one or more fasteners are received through a portion of the closure;
  b. the one or more fasteners pass through the first side wall, and
  c. the one or more fasteners are secured to at least one of the first and the second half-locks so that the electronic components do not slide within the blind bore.

19. The computerized temple of claim 15, wherein the closure forms a part of a charging port used to charge one or more of the electronic components.

* * * * *